US005255573A

United States Patent [19]

Estabrook

[11] Patent Number: 5,255,573

[45] Date of Patent: Oct. 26, 1993

[54] WINCH HANDLE

[75] Inventor: Tripp Estabrook, Newport, R.I.

[73] Assignee: Harken, Inc., Pewaukee, Wis.

[21] Appl. No.: 962,021

[22] Filed: Oct. 15, 1992

Related U.S. Application Data

[63] Continuation of Ser. No. 823,846, Jan. 22, 1992, abandoned.

[51] Int. Cl.[5] .......... F16C 13/00

[52] U.S. Cl. .......... 74/545; 74/543; 74/553; 384/543

[58] Field of Search .......... 74/557, 553, 523, 528, 74/536, 543, 544, 545, 546, 547; 384/543, 544, 545, 546

[56] References Cited

U.S. PATENT DOCUMENTS

| | | | |
|---|---|---|---|
| Re.20,890 | 10/1938 | Thorp | 74/557 |
| 1,356,776 | 10/1920 | Meed | 74/546 |
| 1,936,037 | 11/1933 | Webb | 74/557 |
| 2,285,092 | 11/1966 | Sokol | 74/557 |
| 2,509,319 | 5/1950 | Sinko | 74/557 |
| 2,627,330 | 2/1953 | Gantz | 74/547 X |
| 2,879,008 | 3/1959 | Boychick | 74/557 |
| 2,913,195 | 11/1959 | Phillips | 74/547 X |
| 3,109,312 | 11/1963 | Haupt | 74/543 |
| 3,282,124 | 11/1966 | Peterson | 74/557 X |
| 3,536,299 | 10/1970 | McCloud et al. | 74/547 X |
| 3,599,937 | 8/1971 | Carter | 74/557 X |
| 3,979,967 | 9/1976 | Dunlap | 74/553 X |
| 4,404,866 | 9/1983 | Koike et al. | 74/546 |
| 4,531,715 | 7/1985 | Wiens | 74/547 X |
| 4,583,420 | 4/1986 | Miley | 74/557 |
| 4,603,600 | 8/1986 | Yamazaki | 74/543 |
| 4,674,355 | 6/1987 | Klein | 384/543 X |
| 4,821,597 | 4/1989 | Marciniak et al. | 74/557 X |
| 4,991,461 | 2/1991 | Sennett et al. | 74/553 |
| 4,998,321 | 3/1991 | Gaffney et al. | 74/557 X |
| 5,150,853 | 9/1992 | Bernard | 74/545 X |

FOREIGN PATENT DOCUMENTS

| | | | |
|---|---|---|---|
| 3708635 | 9/1987 | Fed. Rep. of Germany | 74/557 |
| 0184516 | 7/1989 | Japan | 74/557 |
| 310742 | 11/1955 | Switzerland | 74/547 |
| 848123 | 9/1960 | United Kingdom | 74/547 |

*Primary Examiner*—Vinh T. Luong
*Attorney, Agent, or Firm*—Juettner Pyle & Lloyd

[57] ABSTRACT

A manually operated winch crank is characterized by a crank arm having a shaft extending at right angles to the arm, a tubular handle rotatably mounted on the shaft, and a reduced height knob rotatably mounted above the tubular handle. The tubular handle is manually operated with the palm parallel to the axis of rotation, and the knob is operated with the palm perpendicular to the axis of rotation.

6 Claims, 1 Drawing Sheet

WINCH HANDLE

This is a continuation of copending application Ser. No. 07,823,846 filed on Jan. 22, 1992 now abandoned.

BACKGROUND OF THE INVENTION

This invention relates to winch handles or hand cranks which are used to manually operate a winch or capstan. For example, many larger sailboats utilize winches to provide a mechanical advantage in controlling lines such as a fairleads and halyards. The winch has a drive socket for releasably receiving a lug of the winch handle. The line is wrapped around the drum of the winch, and the winch contains gears to provide a mechanical advantage between the crank and the drive socket and drum.

A conventional winch handle comprises an arm extending away from the rotational axis of the winch, and an upright shaft at the free end of the arm. A handle of generally tubular shape is rotatably mounted on the shaft. The crane is rotated by manually grasping the handle, with the palm of the hand being generally parallel to the axis of rotation of the handle and winch. Another conventional version currently in use comprises a pair of identical rotatable tubular handles mounted in succession on a common shaft. This permits two handed operation by one or two people. The latter type is used primarily for heavy load conditions because it is larger and more clumsy to use and store than the single handle version. In sailboats, winch handles are normally stowed in vertical pockets in the cockpit with the grip projecting at right angles at the top of the pocket.

SUMMARY OF THE INVENTION

In accordance with the present invention, a two handed winch crank is provided with a conventional lower tubular handle and a separate shorter upper rotatable knob having an enlarged outwardly facing head. The lower handle is operated with the palm parallel to the axis of rotation, whereas the upper knob is operated with the palm facing downwardly or perpendicular to the axis of rotation. This allows for faster and more efficient cranking in comparison to conventional two handle cranks. Also, the strength and weight of the arm and shaft may be less than conventional two handle versions because the reduced height or shaft length provides less bending moments on these parts. Finally, the crank of the present invention, being reasonably compact and easy to use, can eliminate the need for having to carry two types of handles on a sailboat.

THE DRAWINGS

DESCRIPTION OF THE PREFERRED EMBODIMENTS

Figure 1:
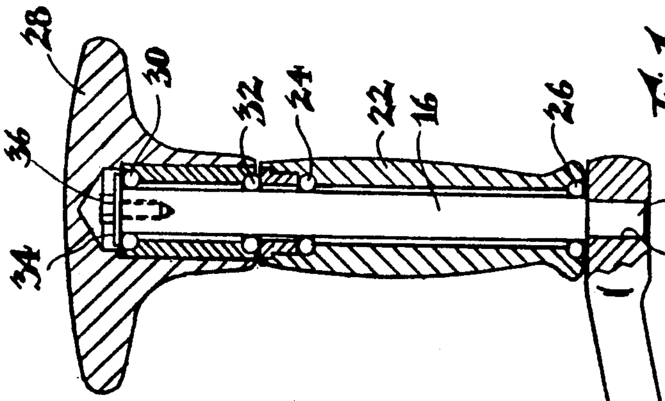
FIG. 1 is a side view, partly in section, of the winch crank of the present invention.
Figure 1:
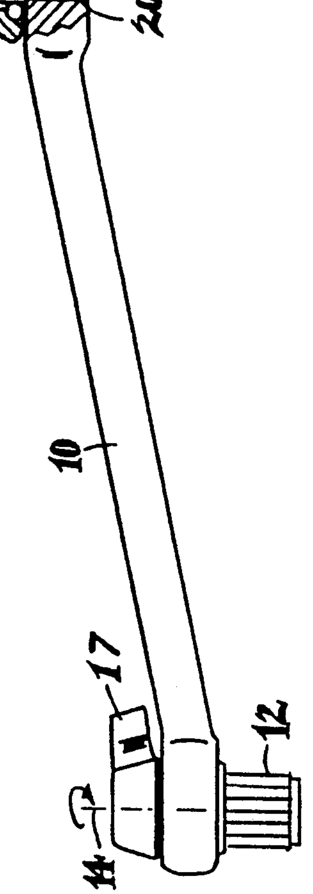

FIG. 1 illustrates a winch cranking device comprising an elongated crank arm 10 having a faceted downwardly depending lug 12 secured at one end and adapted to drivingly engage a drive socket of a conventional winch (not shown) and to rotate the socket around a generally vertical axis in the orientation shown at 14. A conventional locking device 16,17 may be employed to releasably lock the lug 12 into the socket.

The crank arm 10 is angled slightly upward from horizontal from the lug end, with the free end of the arm having an upwardly extending or vertical shaft 16, which extends at right angles from the arm and is secured to the arm by means of securement of a lower portion 18 of the shaft 16 into an opening 20 in the arm. The axis of the shaft is generally parallel to the axis of rotation 14 at the winch.

A lower, conventional handle 22 or grip of elongated tubular or barrel shape is rotatably mounted on the shaft 16 adjacent to the arm 10 by means of bearings, such as the upper 24 and lower 26 ball bearing races between the shaft and the respective ends of the handle.

In addition, and contrary to similar devices in the prior art, the upper or second handle 28 is in the form of a separate rotatable knob having a relatively enlarged head. The knob 28 is rotatably mounted on the free end of shaft 16 adjacent to the upper end of lower handle 22 by means of upper 30 and lower 32 ball bearing races. The knob 28 is restrained from upper axial movement by means of a washer 34 bearing downwardly on its outer periphery against the upper ball race, and having its central portion secured to the end of the shaft 16 by a bolt 36. As shown, the lower bearing race 32 may also bear on the top edge of the lower handle 22.

The lower handle 22 is intended to be operated in a conventional fashion, with he palm of the hand extending parallel to the axis of rotation around the shaft. In contrast, the upper, separately rotatable, knob 28 is designed and intended to be operated with the palm facing downwardly, or perpendicular to the axis of rotation, with the palm against or spaced from the upper rounded surface of the knob. Conventional two handle cranks cannot be operated in this fashion because there is a fixed end portion above the second handle.

It will be noted in FIG. 1 that the upper knob 28 has a height or length which is substantially less than the height or length of the lower handle 22. This provides a more compact profile and provides reduced bending movements on the shaft and crank arm in comparison with conventional versions, allowing a lighter weight construction.

In addition, the use of the knob 28 alone facilitates faster cranking, especially at lower loads or when the line is relatively slack. Two handed cranking is also facilitated, since the upper knob allows for a more efficient or compact form of movement between the hands and arms. Thus, the crank may be operated by the use of the handle or knob separately, or the use of both parts together.

Figure 2:
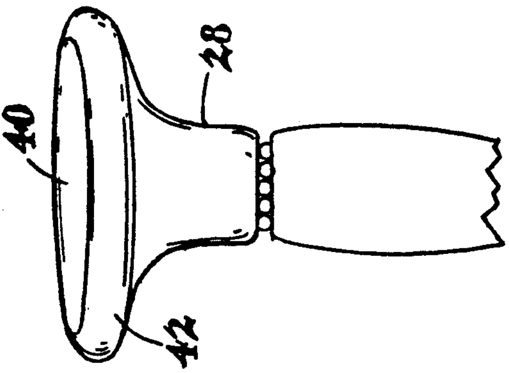
FIG. 2 is a perspective view of one version of the winch handles of the present invention.
Figure 3:
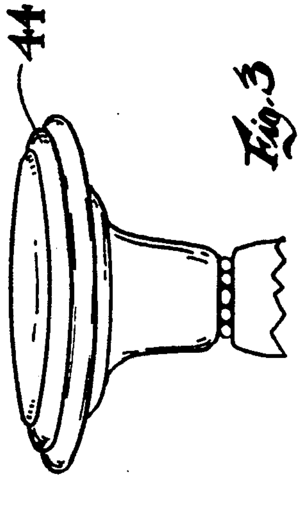
FIG. 3 is a perspective view of a second configuration of the winch handles of the present invention.
Figure 4:
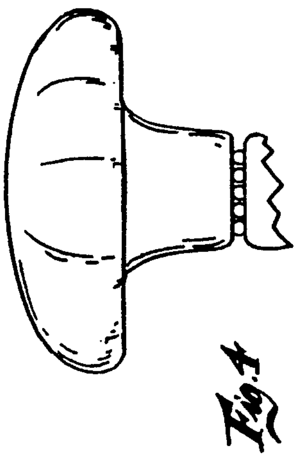
FIG. 4 is a side view of another configuration of the winch handle.

FIGS. 2, 3 and 4 illustrate two of the possible various configurations of the upper knob. As shown in FIG. 2, the knob 28 may have a round or circular upper surface 40 with rounded sides 42. A round shape is easily grasped and facilitates palms down rapid turning of the crank handle. FIG. 3 shows a rounded knob 44 having one or more ridges 44 to prevent slipping. FIG. 4 shows a rounded knob 46 having an elongated T-shaped or oblong body, which is better adapted to fit between the palm and fingers of the hand.

I claim:

1. A sailboat winch crank for rotating a winch mechanism around an axis, said crank comprising a crank arm, one end of said arm being adapted for driving connection to the winch mechanism, the other end having a shaft extending parallel to said axis and terminating at a free end, the improvement comprising an elongated tubular handle rotatably mounted around said shaft adjacent to said arm and adapted to be grasped by the palm of a hand parallel to the axis of rotation, and a knob having an enlarged head separately and freely rotatably mounted on the free end of the shaft, said knob being adapted to be grasped with the palm perpendicular to the axis of rotation, said winch crank being operable by one hand operation of one of the handle and knob, and two hand operation of the handle and knob.

2. The sailboat winch crank of claim 1 comprising bearing means between the handle and shaft and the knob and the shaft.

3. The sailboat winch crank of claim 2 wherein said bearing means comprise races of ball bearings.

4. The winch crank of claim 1 wherein the knob has a round upper surface.

5. The winch crank of claim 1 wherein the knob has an oblong shape.

6. The winch crank of claim 1 wherein the length of the knob along the shaft is substantially less than the length of the handle along the shaft.

* * * * *